UNITED STATES PATENT OFFICE.

GEORGES TRUFFAUT, OF VERSAILLES, FRANCE.

PRODUCT SERVING AS A NITRIFIER, FERTILIZER, AND INSECTICIDE.

1,347,798.     Specification of Letters Patent.     Patented July 27, 1920.

No Drawing.     Application filed February 7, 1918. Serial No. 215,834.

*To all whom it may concern:*

Be it known that I, GEORGES TRUFFAUT, engineer, of 90[bis] Avenue de Paris, at Versailles, Department of the Seine-et-Oise, France, citizen of the French Republic, have invented certain new and useful Improvements in Products Serving as a Nitrifier, Fertilizer, and Insecticide; and I do hereby declare the following to be a full, clear, and exact description of the invention, such as will enable others skilled in the art to which it appertains to make and use the same.

The subject of the present invention is a product which will indirectly generate ammonia, act as a partial sterilizer of the soil, act as a nitrifier, a fertilizer and insecticide and is composed of a mixture of calcium sulfid and of heavy oils or other aromatic hydrocarbons taken from tar, these oils and these hydrocarbons being dephenolized and freed, if desired, from their bases; the mixture may contain in addition crude calcium sulfate and calcium phosphate. Strictly speaking, the fertilizer does not generate ammonia but its action is substantially equal to it, for the reason that it destroys the protozoairs in the soil, which are opposed to the transformation of ammonia existing in the nitrous organic matter of the soil, due to the action of the oxidizing bacterias, as well as the bacterias producing ammonia. It follows from this that the action of the product increases and allows the production of ammonia in the soil.

The calcium sulfid is obtained by the reduction of calcium sulfate by means of charcoal in an ordinary reducing furnace.

The heavy oils and aromatic hydrocarbons may first be treated with commercial sulfuric acid so as to extract the bases, when it is intended to use such bases. If not, the basic materials may be retained and used for the partial sterilization of the soil.

The oils and hydrocarbons washed or not in acids are washed methodically with an alkaline solution, in order to eliminate the phenols which are detrimental to the growth of the future crop.

The proportions of the nitrifying and ammonia producing mixture may be for example as follows:

| | |
|---|---|
| Calcium sulfid | 40 % |
| Heavy oils | 20 % |
| Crude calcium sulfate | 20 % |
| Calcium phosphate | 20 % |

In general, all the hydrocarbons of which the formula shows at least one closed chain being mixed in certain proportions with the calcium sulfid permit of producing, under good conditions, the partial sterilization of the soil by the employment of quantities which will vary according to the constitution of the hydrocarbons employed.

Thus, for example, cymene and naphthalene mixed with calcium sulfid give with certain growths crops double those obtained from non-treated soils. The xylenes which are in quite large proportions in certain heavy petroleum oils have given similar results.

In certain cases the calcium sulfate or the phosphate could be omitted and replaced, if desired, by products having a potassium base or by turf, the essential part of the mixture being the association of calcium sulfid formed by the heating method with a hydrocarbon or a mixture of hydrocarbons of the aromatic series.

Such a composition is intended to take the place of a complete fertilizer.

This product which allows the transformation of ammonia existing in the nitrous organic matter of the soil, is a nitrifier and fertilizer, assisting in the transformation of organic nitrogen into ammoniacal nitrogen and into nitric acid, and partially sterilizing the soil by slow disengagement of the sulfuretted hydrogen and by emission of heavy vapors of the aromatic hydrocarbons which destroy the organisms not destroyed by the ammonification and nitrification such as amœbæ, protozoa, anguillulæ and animal and vegetable toxins.

The production of soluble nitrogen is thus very much increased replacing mineral or organic nitrated fertilizer. This product renders useful the reserve potash of the soil by the presence of crude calcium sulfate; it provides phosphoric acids since it contains calcium phosphate. It is, in addition, an insecticide.

The sulfuretted hydrogen released by the slow dissociation of the calcium sulfid acts as a toxic on the insects in the soil as do the vapors of the aromatic hydrocarbons.

I claim:

1. A product for destroying the protozoairs in the soil, which are opposed to the transformation of ammonia existing in the nitrous organic matter of the soil, acting as a partial sterilizer of the soil, and as a fertilizer and insecticide, comprising a mixture of calcium sulfid and aromatic hydrocarbons which have been dephenolized and freed from their bases.

2. A product for destroying the protozoairs in the soil, which are opposed to the transformation of ammonia existing in the nitrous organic matter of the soil, acting as a partial sterilizer of the soil, and as a fertilizer and insecticide, comprising calcium sulfid, aromatic hydrocarbons which have been dephenolized and freed from their bases, crude calcium sulfate and calcium phosphate.

In testimony whereof I affix my signature, in presence of two witnesses.

GEORGES TRUFFAUT.

Witnesses:
CHAS. P. PRESSLY,
ALEXANDRE BERTHOLLE.